Figure 1:
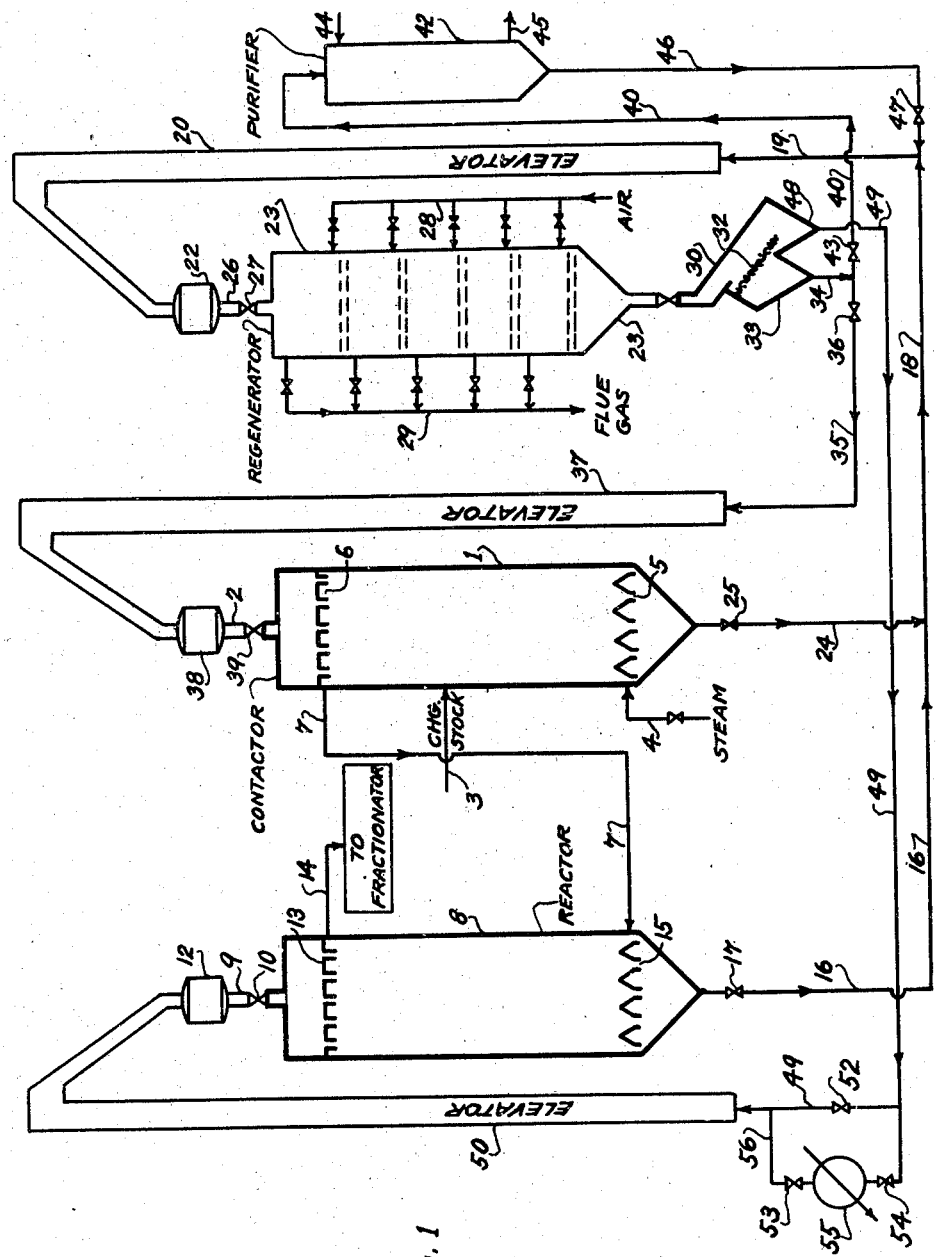

March 1, 1949. H. D. NOLL 2,462,891
CONTACT CONVERSION OF HYDROCARBONS
Filed Sept. 13, 1945 2 Sheets-Sheet 1

INVENTOR.
HENRY D. NOLL
BY
ATTORNEY

March 1, 1949. H. D. NOLL 2,462,891
CONTACT CONVERSION OF HYDROCARBONS
Filed Sept. 13, 1945 2 Sheets-Sheet 2

INVENTOR.
HENRY D. NOLL
BY
ATTORNEY

UNITED STATES PATENT OFFICE 2,462,891

CONTACT CONVERSION OF HYDROCARBONS

Henry D. Noll, Denville, N. J., assignor to Houdry Process Corporation, Wilmington, Del., a corporation of Delaware Application September 13, 1945, Serial No. 616,054

7 Claims. (Cl. 196—52)

The present invention relates to the conversion of hydrocarbons such as petroleum fractions. More particularly the invention relates to processes for converting hydrocarbons by fluent solid catalysts while making efficient use of the heat involved in such processes. Many catalytic conversion processes include an operation, regeneration, in which considerable heat is generated by combustion of the carbonaceous deposit which was concomitantly deposited on the catalyst as the conversion proceeded. This invention usefully employs such heat in the preparation of the charge stock for the conversion.

An important phase of modern petroleum technology is the conversion of hydrocarbons of different size or molecular structure where the conversion is directed and accelerated by contacting hydrocarbons with solid catalysts at the proper conversion conditions of temperature, pressure, catalyst to oil ratio and the like. The conversion process can be made continuous by using a solid catalyst which is fluent and therefore can be passed continuously through the conversion zone. Like any solid, the catalyst becomes fluent or capable of flow when in a granular or pulverulent form, such as particles from 5 microns to 7 millimeters in size. The larger sizes, in the range of about 0.1 to 7 millimeters, can be advantageously handled as a moving bed, and the smaller sizes, in the range of about 5 to 500 microns, may be aerated by gas and handled somewhat like a fluid. The fluent catalyst then moves in a circuit containing a conversion or reaction zone in which hydrocarbons are contacted and converted, and a regeneration zone in which the carbonaceous deposit (coke) deposited on the catalyst during the conversion is burned off. The heat generated in the regeneration zone frequently exceeds the heat which can be transferred to the conversion zone by the heat capacity of the catalyst. The excess heat is therefore removed from the regeneration zone by indirect heat exchange and used elsewhere in the refinery.

An object of the present invention is to provide new and improved processes for the catalytic conversion of hydrocarbons. Another object of the present invention is to provide new and useful conversion processes which involve a combination of exothermic and endothermic phases.

The conversion process can be, for example, a cracking operation in which a high boiling charge stock is converted to lower boiling products such as gasoline, a dehydrogenation or hydrogenation operation either with or without cracking, or the like. The present invention has particular application to processes for the catalytic cracking of high boiling stocks. The following discussion, which is largely concerned with such operations, illustrates some applications of the invention.

According to my invention, I contact a hydrocarbon charge stock, whose temperature is below the conversion temperature, with a relatively inert fluent solid that has previously been heated above the conversion temperature by passage through a regeneration zone in admixture with a catalyst undergoing regeneration. The heat content of the relatively inert fluent solid furnishes, by direct heat exchange, some or all of the heat required to raise the temperature of the charge stock to at least the conversion temperature. The charge stock, in vapor form, is separated from the relatively inert fluent solid and the stock is then passed to a conversion zone where it is contacted with a fluent solid conversion catalyst. The catalyst, after contact with the vapors of the charge stock, is contaminated with coke and is therefore removed from the conversion zone for regeneration. The relatively inert fluent solid, whose heat content has been decreased by the heat used in preparing the charge stock, is mixed with the catalyst from the conversion zone, and the resultant mixture introduced into the regeneration zone where combustion of coke on either material occurs. After regeneration, the relatively inert fluent solid and the fluent solid catalyst are separated and recycled. Heat from combustion of the coke is thus employed usefully in the preparation of the charge stock.

In the process of this invention, a relatively inert fluent solid is employed which is physically separable from the catalyst and which is refractory and preferably has high heat capacity. The inert solid may be porous or non-porous, but regardless of its porosity, it is employed in the form of pieces or particles of such size that sufficient surface is available to insure a rapid and efficient flow of heat from the solid to the charge stock. The size is also determined by the manner in which the fluent solid is moved.

This invention is adaptable to various charge stocks and methods of operation, since the relatively inert fluent solid and the catalyst after regeneration are separated and I can therefore separately treat and separately control both materials. The present invention thus separates the functions of catalytic action and heat capacity by using two materials, each of which is suited to the function which it performs. Thus, either the relatively inert fluent solid or the catalyst can be cooled separately. In a preferred mode of operation, I discharge the mixture of relatively inert fluent solid and catalyst from the regeneration zone at the highest temperature not deleterious to the catalyst, separate the two materials, cool the catalyst to the temperature at which it is to be introduced into the cracking zone, and contact the charge stock with the relatively inert fluent solid at a temperature which is higher than the temperature in the cracking zone. The heat generated in the regeneration zone can be used to any desired extent in preparing the charge for catalytic cracking by regulating the amount of relatively inert fluent solid which flows through the regeneration zone and is subsequently contacted with the charge stock. In addition to furnishing any necessary heat for vaporization and for any desired heating of the vapors above the cracking temperature, the heat capacity of the relatively inert fluent solid can also be used so that it furnishes the heat necessary for thermal cracking or vis-breaking. In accomplishing thermal cracking or vis-breaking, I contact the charge stock with hot relatively inert fluent solid, vaporize the volatile portion of the charge stock, and maintain any liquid portion of the charge stock in contact wtih the relatively inert fluent solid for such a time and at such a temperature that hydrocarbon vapors are formed and a substantially non-volatile carbonaceous material or coke is left on the relatively inert fluent solid. Also, the relatively inert fluent solid can be used at a temperature higher than that existing in the regeneration zone by heating it after separation from the catalyst to a temperature greater than that existing in the regeneration zone and thereafter contacting it with the charge stock. Such heating can be efficiently accomplished by utilizing the direct combustion of waste gases or heavy residues. Moreover, since the charge stock can be heated by means of the relatively inert fluent solid to a temperature higher than that in the cracking zone, the endothermic heat of cracking can be at least partially compensated for by charging to the cracking zone hydrocarbon vapors whose heat content exceeds the heat content of these vapors at the cracking temperature.

In one embodiment, the present invention is used for the processing of heavy charge stocks that have a dew point higher than 850° F., at atmospheric pressure, although the invention includes the processing of lower boiling charge stocks. The term, the dew point of a hydrocarbon or hydrocarbon mixture, refers to the temperature below which formation of liquid takes place at atmospheric pressure. It will be understood, of course, that to avoid thermal decomposition, the dew point at atmospheric pressure will usually be calculated from data obtained at reduced pressure, and that the hydrocarbon or hydrocarbon mixture will be free from other materials. Heavy stocks are generally mixtures of hydrocarbons boiling above 400° F. at atmospheric pressure (end of gasoline range) and are generally either virgin or recycle petroleum fractions that are less than 50% vaporized at 650° F., and can have varied boiling ranges, as, for example, a boiling range as wide as 440° to over 1100° F. or a narrower boiling range such as 600° to 1050° F. Regardless of the width of the boiling range of the charge stock, if the dew point is above about 850° F. at atmospheric or slightly higher pressures, thermal decomposition during vaporization at such pressures can be appreciable. The present invention avoids coking difficulties during vaporization by preheating heavy charge stocks, such as those less than 95% vaporized at 800° F., to temperatures below the coking point and then using the heat content of the relatively inert fluent solid to supply the additional heat necessary to raise the charge stock to the cracking temperature or higher. The vaporization of heavy stocks can be aided by steam, hydrocarbon vapors previously cracked or other gases. Stocks which vaporize cleanly without coke formation can be contacted in either liquid or mixed phase form with the relatively inert fluent solid in practicing the invention. The process is especially advantageous when a heavy charge stock which is at least partially in the liquid phase is treated. Despite the fact that heavy charge stocks commonly contain asphaltic materials, such charge stocks can be used in the present invention without treatment to remove asphalt because a large percentage of coke resulting from the decomposition of the asphaltic materials is deposited on the relatively inert fluent solid and not on the catalyst. Since the amount of coke deposited on the catalyst generally determines the length of time a catalyst can be used before regeneration, the deposition of coke from asphaltic materials on the relatively inert fluent solid increases the utility of the catalyst.

Many heavy charge stocks contain appreciable amounts of crystalline salt, brine or other non-volatile inorganic impurities. Such inorganic material, in conventional liquid or mixed phase processing, remains on the catalyst and large amounts cause a rapid deterioration in catalytic activity of most catalysts. The frequent practice of removing inorganic salts from stocks for catalytic cracking increases the processing cost. In one embodiment of the present invention, such charge stocks are vaporized by contact with the relatively inert fluent solid prior to contact with the catalyst and undesirable inorganic residues remain on the relatively inert fluent solid instead of being deposited on the catalyst. The relatively inert fluent solid may be processed to remove such inorganic impurities so that such inorganic residues do not accumulate to such an extent that contact of the relatively inert fluent solid and the catalyst would transfer such material to the catalyst.

It is within the scope of the present invention to use, as charge stocks, petroleum fractions which have been treated prior to cracking in order to reduce the amount of undesirable components. The present invention can also be used in the processing of charge stocks whose dew point is lower than the conversion temperatures such as gasolines, naphthas and light gas oils. Such light charge stocks in either the liquid, vapor or mixed phase can be contacted with the inert solid in direct heat exchange relation. As a result of the heat exchange with the inert solid, the light charge stock is heated at least to the temperature of cracking. Light charges generally deposit little coke on the relatively inert fluent solid. In such cases, the relatively inert fluent solid derives its heat largely from combustion of the coke deposited on the catalyst. Thus, for example, the coke deposited on the relatively inert fluent solid may be insufficient to raise the relatively inert fluent solid to the desired temperature by the heat of combustion. By adjusting the conditions of conversion, sufficient coke can be deposited on the catalyst so that, during regeneration of the mixture of relatively inert fluent solid and catalyst, sufficient heat is evolved to raise the temperature of both materials to the desired temperature. The heat content of these materials subsequently furnishes the heat for vaporization and conversion. When a heavy charge stock, such as a reduced crude, deposits a considerable amount of coke on the relatively inert fluent solid, the amount of coke deposited on a unit volume of the active catalyst may, if desired, be correspondingly reduced by increasing the ratio of the active catalyst to oil. This increases the conversion as well as decreases the amount of coke deposited on a unit volume of the catalyst. Thus, the heat evolved, as well as the temperature attained, during regeneration can be adjusted, without changing the equipment used for regeneration, or the amount of cooling, if any, accomplished within the regeneration zone, by the proper adjustment of the rates of flow of catalyst and relatively inert fluent solid together with adjustment of the conditions in the conversion zone to produce a certain amount of coke. Furthermore, the regeneration of both materials in the same equipment is more economical since a single piece of equipment costs substantially less than two pieces of equipment having the same total capacity.

The material to be used as relatively inert fluent solid is selected or processed so that it is easily separated from the fluent solid catalyst. Also the material should have no undesirable catalytic activity. Also, it can have catalytic activity which is relatively minor as contrasted to the catalytic activity of the catalyst (a relatively minor catalytic activity is an activity of less than 15 as measured by the test given in "National Petroleum News," volume 36, No. 31, R–537–38). The separation of the relatively inert fluent solid and the fluent solid catalyst can be accomplished by any conventional means of physically separating two solids different in physical properties and should be adapted to the particular type of fluent catalyst employed. The relatively inert fluent solid is mixed with the granular or pulverulent catalyst and thereafter moves concurrently with the catalyst until separated. In moving bed operations, it is preferred to separate the relatively inert fluent solid and the fluent catalyst on a basis of size; thus one material can be fine and the other relatively coarse. Such a separation can be made by flowing the mixed materials over a fixed screen, by a vibrating screen, a rotating inclined cylindrical screen, an air classifier, and the like. When practicing the present invention in connection with aerated or suspended catalysts, a convenient mode of separation is by air classification. Where the presence of such material is not deleterious to the catalytic process, either the relatively inert fluent solid or the fluent catalyst can include ferromagnetic material, and the separation is then based on a difference in magnetic properties. Also, the relatively inert fluent solid and the fluent solid catalyst can be classified by shape; i. e., one material can be spherical and the other irregular in shape.

Since a function of the relatively inert material is to transfer heat, its heat capacity is preferably high and materials are suitable whose specific heats are greater than 0.15 and preferably above 0.25 (these values for the specific heats being measured at the temperatures of operation of the process). Considerable efficiency in heat transfer can be realized when the material has not only a high specific heat, but is also dense so that the volumetric heat capacity is high. Thus a material having a somewhat low specific heat may have a compensatingly higher density. In general, materials having a volumetric heat capacity of greater than 400 gram-calories per liter per degree C (measured at the operating temperature) are suitable, although heat capacities in the range 700 to 1300 gram-calories per liter per degree C are preferred. One of the advantages of the present invention over a process that depends on the catalyst for heat transfer is that, in the latter process, the catalyst must be selected primarily for its catalytic properties and secondly for its heat capacity, whereas, in practicing the present invention, heat is transferred by a relatively inert fluent solid selected with regard to heat capacity. The relatively inert fluent solid should be capable of withstanding high temperatures of the order of 1000 to 2000° F. and should not react chemically with materials used in the process. Suitable materials are various oxides of the second, third and fourth groups of the periodic table, for example, alumina, silica, beryllia and zirconia. Preferred forms of these materials, which possess the desired characteristics of cheapness, availability and high heat capacity, include corundum, fused quartz, magnesia, mixtures of these materials, and commercial modifications of these materials such as sand, "Alundum," "Corhart" and the like. The relatively inert fluent solid may consist of one or more components and it may be prepared by fusion, precipitation, gelation or related methods. Infusible metals can be used in the free state, but the metal should be selected so that it does not have an adverse catalytic effect. Various silicates, carbides, dead burned ores such as crude rare earths, natural refractories, crushed igneous rocks, inactive clays, spent catalyst which may have been subjected to dead burning, and the like may also be used. Thus, a suitable material can be selected for the various modifications of this invention in accordance with the conditions of operation or the materials used in the modification.

Figure 2:
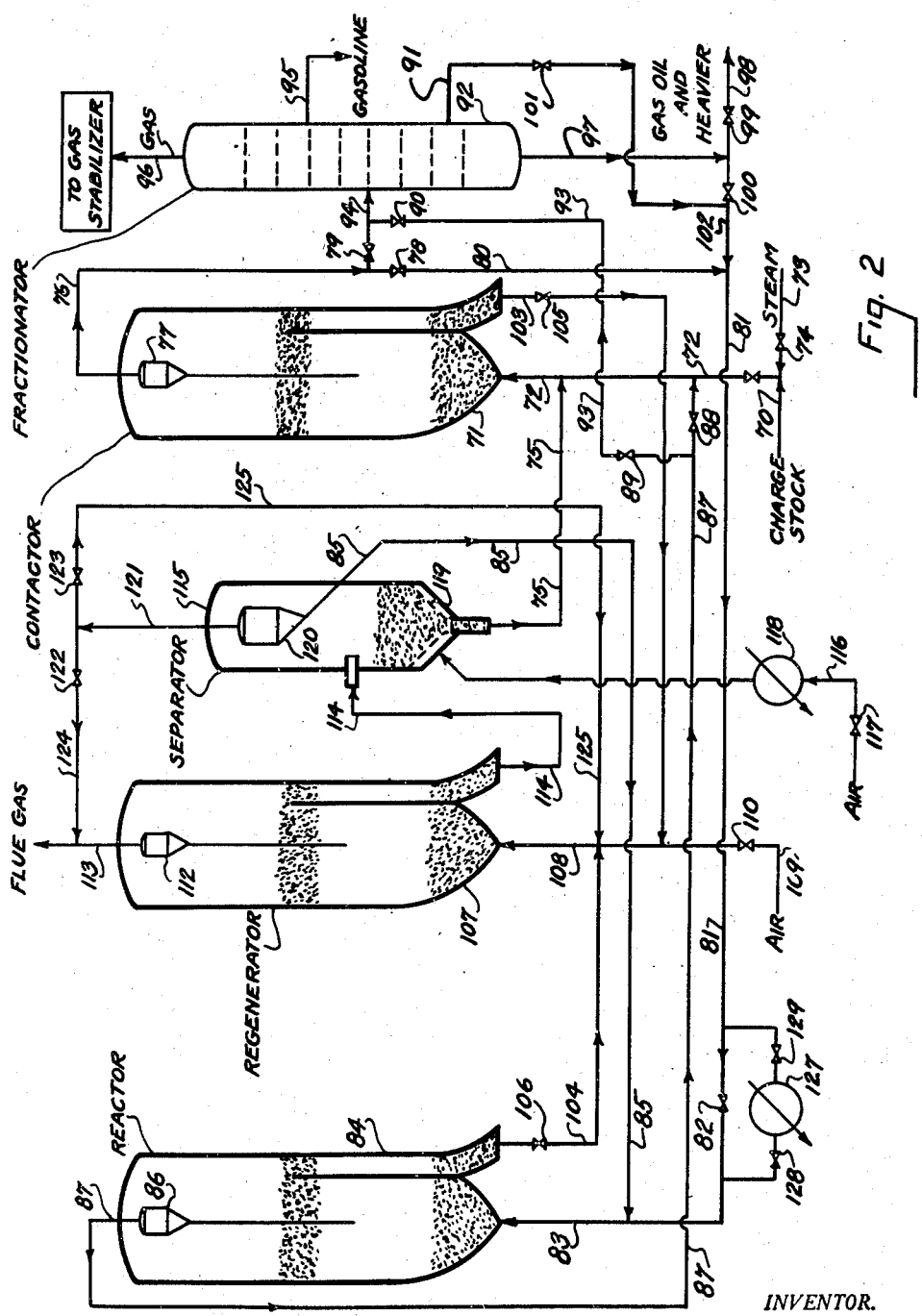

The invention will now be described more in detail in connection with the accompanying drawings in which Figures 1 and 2 are diagrammatic flow sheets illustrating the application of the invention to two types of cracking processes.

Figure 1 illustrates an embodiment of the present invention as applied to the art of cracking by means of a moving bed of catalyst. The use of fluent catalysts in moving beds is a well-known process and has been described in the literature. (See for example, a paper by Newton, Dunham and Simpson in "Transactions of the American Institute of Chemical Engineers," page 215, April 1945 and the articles there cited.) A heated relatively inert fluent solid, in the form of particles or granules, is charged to the top of contactor 1 by line 2 and moves downwardly as a bed. A heavy charge stock, such as a reduced crude having a dew point above 850° F., is introduced to the moving bed of heated relatively inert fluent solid at a point substantially below the top by line 3. The heavy charge stock may have been heated in a furnace previously or may be charged to the contactor at a relatively low temperature such as a temperature below 300 to 500° F., but preferably the charge stock is not heated above the coking point. Steam, for aiding the vaporization of the charge stock or for purging the relatively inert fluent solid, is added by line 4 to the vapor disengaging section 5 of contactor 1. The charge stock introduced by line 3 is vaporized by contact with the bed of hot relatively inert fluent solid, is additionally heated by its upward passage through the bed, and is taken off in disengaging section 6 of contactor 1 by line 7 and thence passed to reactor 8 where it is contacted with a moving bed of catalyst charged to the top of reactor 8 through line 9 and valve 10 from hopper 12. The hydrocarbon vapors pass upwardly through a downwardly moving bed of catalyst and are thereby cracked. Cracked hydrocarbon vapors are removed from the catalyst in vapor disengaging section 13 which also distributes the catalyst evenly over the bed and allows space for the disengaging of vapor. Cracked hydrocarbon vapors taken off from the top of the bed of catalyst by line 14 are passed to a fractionating system and are thereafter appropriately processed. The downwardly moving bed of catalyst moves through section 15 at the bottom of the reactor where the uncracked vapors are added and thence discharges from reactor 8 through line 16 and valve 17 which regulates its rate of discharge. The catalyst at this point has been decreased in activity by the carbonaceous material which is deposited on it during cracking. The relatively inert fluent solid from contactor 1 is discharged by line 24 through valve 25 which regulates its rate of discharge. The relatively inert fluent solid and the cracking catalyst are combined in line 18 and pass coincidently by line 19 to elevator 20 which charges them to hopper 22 above the regenerator 23.

The resultant mixture of relatively inert fluent solid and catalyst both of which may contain coke are charged by line 26 through valve 27 to regenerator 23. The regenerator 23 is a kiln, into which air is introduced at a number of points from manifold 28 and in which the temperatures of various sections are controlled by a number of cooling units (not shown) placed at intervals along the vertical length of the regenerator (such a kiln is described in the above cited paper by Newton, Dunham and Simpson). Flue gas is removed from the regenerator by manifold 29 and thereafter passes to appropriate devices for the separation of any fine catalyst that may have been carried out of the regenerator. The moving bed of the mixture of solid materials in the regenerator is discharged from the bottom into a separator 30 where it falls onto a screen 32. The relatively inert fluent solid is a material finer than the catalyst and therefore falls through the screen 32 into a hopper 33 from which it is removed by line 34. The relatively inert fluent solid heated by passage through the regeneration zone can be charged by line 35 through valve 36 to elevator 37 which carries it to a hopper 38 above the contactor 1 to which it is charged through line 2 and valve 39 which regulates its rate of flow into the contactor.

When the charge stocks contain inorganic residues which remain on the relatively inert fluent solid after vaporization of the hydrocarbons, a portion of the relatively inert fluent solid can be passed by line 40 through purifier 42 after it leaves the regenerator by the proper adjustment of valves 36 and 43. The relatively inert fluent solid passing through purifier 42 is contacted with a liquid solvent or a treating gas which removes the accumulated inorganic residues. Thus, when water is introduced to the purifier by line 44, it contacts the relatively inert fluent solid in the purifier and thereby removes any inorganic residue such as salt. The solvent, carrying the dissolved inorganic residue, is removed from the purifier by means of line 45. Other means of purifying the relatively inert fluent solid may be used such as the reduction of iron oxide by hydrogen followed by treatment with chlorine to volatilize the iron as a volatile halide. The discharge of the purified relatively inert fluent solid from purifier 42 through line 46 is regulated by valve 47 and is combined with material from the reactor in line 18 and passed to the regenerator 23 by line 19.

The catalyst is coarser than the relatively inert fluent solid and is therefore retained on the surface of the screen 32. It moves down over the screen and discharges into a hopper 48. The reactivated or restored catalyst in hopper 48 is removed by line 49 and conveyed to an elevator 50 which charges it to the hopper 12 above the reactor 8. The catalyst can be cooled before charging it to the reactor by closing valve 52 and opening valves 53 and 54 and passing it through a heat interchanger 55 in line 56.

Figure 2 is a schematic diagram of another aspect of the invention in which the fluent catalyst is handled in a fluidized condition. Such a method of handling fluent solids is well-known (see for example "Improved fluid process for catalytic cracking," Murphy et al., "Transactions of the American Institute of Chemical Engineers," page 19, February 1945, and the articles there cited). A heavy charge stock, in line 70, which may have been heated previously in a furnace, is introduced to contactor 71 through line 72. If desired, steam in line 73 may be added by opening valve 74. Coincidentally with the charge stock, a hot relatively inert fluent solid in line 75 is introduced into the bottom of the contactor 71. The vapor velocity of ascending vapors is regulated so that the relatively inert fluent solid in contactor 71 forms a dense phase which behaves somewhat like an ebullient liquid. The charge stock is vaporized by contact with the relatively inert solid and is removed from the contactor 71 by line 76 after passing through cyclone separator 77 which removes and returns to the dense phase any relatively inert solid which has been swept along with the vapors. The hydrocarbon vapors from the contactor pass by lines 76 and 80 to line 81 (valve 79 being closed and valve 78 open), through open valve 82 and thence are charged by line 83 to reactor 84. A fluent solid catalyst is added to the hydrocarbon vapors in line 83 by line 85. The vapor velocity of the ascending hydrocarbon vapors in reactor 85 is maintained at such a rate that the catalyst in the reactor forms a dense phase in a similar manner to the relatively inert fluent solid in contactor 71. The hydrocarbon vapors, after contact with the catalyst, are disengaged from the catalyst and passed through cyclone separator 86 and removed from the reactor by line 87.

The cracked hydrocarbon vapors or synthetic crude may be charged directly into the fractionator 92 by lines 93 and 94, valves 88 and 79 being closed and valves 89 and 90 being open. The synthetic crude in this case is fractionated and gasoline is taken off from the fractionator by line 95 while light gases such as hydrogen, methane, and gases including butane are taken off by line 96, whence they are sent to a stabilizer for appropriate processing. The heavy fractions, such as gas oil and heavier, are removed from the fractionator 92 by line 97. They may be removed from the system through line 98 by opening valve 99 and closing valve 100. By closing valve 99 and opening valve 100, the heavy fractions may be returned for cracking through line 102.

In another mode of operation, the synthetic crude may be mixed with the charge stock by closing valve 89 and opening valve 88. The vapors emerging from the contactor 71 in line 76 are then sent directly to the fractionator 92 by line 94 by closing valves 78 and 90 and opening valve 79. In this event, gasoline and gas are taken off as before and the heavy fractions, which include recycle stock from the previous cracking operation together with the fresh charge, may be removed from the fractionator by line 97 and thence sent to reactor for cracking as previously described. If, however, the stock charged to the reactor under such conditions proves to be too high boiling and difficulty is encountered in adequately vaporizing the material charged to the reactor, an alternate method of operation can be employed. Valve 100 is closed and valve 101 opened and a gas oil fraction taken off from the fractionator 92 by line 91 is charged to line 102 and thence to reactor 84. When this method of operation is used, a heavy residue is taken off the fractionator by line 97 and removed from the system by line 98, valve 99 being open.

When the synthetic crude is added to the charge stock, several advantages are obtained. The vaporization of the charge stock is increased due to that portion of the recycle stock which boils below the charge stock, and the heat content of the synthetic crude can be utilized in heating the charge stock. Furthermore, the material taken overhead from contactor 71 is improved in that it is a clean stock, and heavy asphaltic material in either the recycle or charge stock remains on the relatively inert fluent solid in contactor 71.

After contact of the catalyst and the relatively inert fluent solid with hydrocarbon vapors, which concomitantly leaves a deposit of coke on the catalyst as a result of cracking and frequently leaves a carbonaceous deposit on the relatively inert fluent solid, the relatively inert fluent solid and the catalyst are removed from their respective zones by lines 103 and 104. Valves 105 and 106, respectively, regulate the rate of discharge of these materials. The relatively inert fluent solid and the catalyst are mixed and introduced into a regenerator 107 by line 108. Air, from line 109, preheated to any desired extent, is introduced with the relatively inert fluent solid and the catalyst at the bottom of the regenerator by line 108. The vapor velocity of the air is regulated by valve 110 so that the relatively inert fluent solid and the catalyst form a fluidized bed in regenerator 107. The air by combustion of the carbonaceous deposits on the fluent solids present in regenerator 107 forms flue gas which is disengaged from the fluidized bed and passed through cyclone separator 112 and removed from the regenerator by line 113. It can be thereafter processed appropriately to remove any fines that have been carried along. The commingled relatively inert fluent solid and catalyst are removed from the regenerator by line 114 and charged to a separator 115. Air from line 116 whose flow is adjusted by valve 117 and which passes through heat interchanger 118 is introduced to the bottom of the separator 115 and passes upwardly through a grid or perforated plate 119 at such a velocity that the relatively inert fluent solid, which has less buoyancy than the catalyst, remains substantially as a bed above the grid while the more buoyant catalyst is carried upward to a cyclone separator 120 in which it is separated from the air which passes off by line 121. The separator may be operated in several ways. The commingled relatively inert fluent solid and the catalyst can be discharged from the regenerator 107 before regeneration is complete and regeneration completed in the separator, in which event the gas separated from the catalyst in cyclone separator 120 is essentially flue gas and is combined with the flue gas in line 113 from the regenerator 107 by opening valve 122 and closing valve 123 and passing the exit gas in line 121 through line 124. If regeneration in the regenerator 107 was essentially complete, the air emerging from the separator 115 may be used in regenerator 107 by closing valve 122 and opening 123 and conveying the hot air by lines 121 and 125 to line 108 in which it is commingled with the relatively inert fluent solid and the catalyst introduced to the regenerator. In some cases, the material selected for use as the relatively inert fluent solid may be easily separable from the catalyst and separator 115 may be eliminated. In this event, cyclone separator 112 is altered to perform the same function as separator 120 and the bottom of regenerator 107 is constructed to incorporate the features of the separator 115. Under these conditions, the relatively inert fluent solid may be introduced into the regenerator at a higher point than the catalyst.

The temperatures and heat balances of the regenerator and separator can be considerably varied depending on the temperatures of the incoming air streams and the mode of operation of each or both. Thus, the temperature in regenerator 107 can be lowered by introducing relatively cool air in line 109 or raised by using hot air from the separator. If the operating temperature of the regenerator is higher than the temperature at which the catalyst is charged to the reactor 84, the excess heat can be used for preheating the air for regeneration by the proper operation of the separator. Other variations will be obvious to those skilled in the art.

The relatively inert fluent solid after separation from the catalyst is discharged from the separator 120 by line 75 and thence returned to the contactor 71 where it is again contacted with the charge stock. The freshly regenerated catalyst separated in cyclone separator 120 is returned by line 85 to the reactor 84 where it again contacts and cracks hydrocarbon vapors. The catalyst can be discharged from separator 115 with a heat content in excess of that needed in the reactor 84. This excess heat can be utilized in vaporizing hydrocarbon charge stocks from the fractionator 95. If such heat is not available, the charge stock can be vaporized by passing it through a heat exchanger 127 (or a furnace) by closing valve 82 and opening valves 128 and 129. The synthetic crude vapors issuing from reactor 84 can be used in indirect heat exchange with such charge stocks.

The conditions of cracking in reactors 8 and 84 are well-known and, in general, are included in the ranges, 750 to 1100° F., about atmospheric to 100 pounds per square inch pressure, and a catalyst to oil ratio of about 0.1 to 5. Any or all of the more severe conditions of cracking (higher temperature, higher pressure, and high catalyst to oil ratio) are used for more refractory or lower boiling stock. The higher conditions of temperature can be used where a high content of aromatic or olefinic hydrocarbons in the product is desired, or where it is desired to retreat a catalytically cracked gasoline to produce aviation base stock.

In a fluidized operation, the catalyst is used in the form of particles about 5 to 500 microns in size. In the moving bed operation, the catalyst may be used in any convenient form such as extruded or molded pellets, formed spheres or pellets, or crushed or sized particles. Among the various catalysts which can be used are acid treated clays, such as montmorillonite, prepared silica-alumina gels, prepared silica-zirconia gels, zirconium phosphate, prepared silica-urania gels, or mixtures of these and similar materials.

The conditions of operation should include a selection of a catalyst of proper activity and control of the temperature of regeneration. In Figure 2, control of the temperature of regeneration can be obtained by removing a portion of the fluent solids, cooling and recycling them to the regenerator. In Figure 1 where regenerator 23 is a kiln (of the type described in the above cited paper by Newton, Dunham and Simpson), the construction is such that considerable amounts of coke can be burned without exceeding temperatures which would be deleterious to the catalyst. Therefore, a quantity of coke may be deposited on the relatively inert fluent solid which is greater than the amount whose combustion would yield more heat than the increase in heat content of the relatively inert fluent solid caused by its passage through the regenerator.

Different methods employing various flows and treatments of the relatively inert fluent solid after its discharge from the regenerator are within the scope of this invention. Thus, the combined relatively inert fluent solid and catalyst can be discharged from the regenerator at a temperature at least 50° F. above the temperature in the reactor and preferably 100 to 200° F. or higher, the two materials separated, and the catalyst cooled to the temperature of cracking while the relatively inert fluent solid is charged to the contactor at essentially the temperature of emergence from the regenerator. In another mode of operation, the relatively inert fluent solid can be treated with a solvent to remove inorganic impurities prior to regeneration. The use of a particular method for a given operation will depend, among other factors, upon the type of charge stock used. Stocks having dew points above 850° F. and therefore liable to coke during vaporization, can be preheated to less than 850° F. and then contacted with a sufficient amount of the relatively inert fluent solid at a temperature above 850° F. to furnish sufficient heat to heat the charge stock to at least the conversion temperature. Charge stocks will vary considerably both in the amount of coke-like material deposited on the relatively inert fluent solid and in the temperature to which they are preheated, but the proper amount of heat can be furnished by adjusting the quantity and rate of flow of the relatively inert fluent solid.

It should be noted that the invention has been described in connection with Figures 1 and 2 which are merely schematic diagrams. In the interest of clarity and simplicity, considerable conventional equipment has been omitted from these figures, but it is to be understood that, in practice, such equipment will be supplied as it used in various well-known methods of introducing, removing and controlling fluent solids. Such equipment as star valves, pocket rotary valves, screw conveyors, hoppers, stand pipes, elevators, pneumatic lifts, and the like have been omitted, but would be used in practice. Also, it is to be understood that solid materials passing from one zone to another will be properly purged of gases or liquids that would interfere with the operation of a succeeding zone. Thus, for example, the catalyst removed from a reaction zone is purged with steam or some other inert gas in order to remove from the catalyst any occluded gases or vaporizable liquids that would interfere with subsequent operations such as regeneration.

The processes described above illustrate only a few typical applications within the scope of this invention. Many variations are possible without departing from the spirit of the invention. For example, in Figure 1, the relatively inert fluent solid may be coarse and the catalyst fine, or the charge stock may be sprayed on the top of the bed of the relatively inert fluent solid in contactor 1. Regardless of source, charge stocks can be any hydrocarbon mixture of the same specifications as those described above. Moreover, the invention can be used in any desired manner to remove heat from an operating zone in which an exothermic reaction is occurring in order to utilize such heat later in another operating zone of the system. It will be accordingly understood by those skilled in the art that the processes here disclosed may be varied within the scope of the invention and that the invention is limited only by the appended claims.

I claim as my invention:

1. In hydrocarbon conversion processes employing fluent granular solid hydrocarbon conversion catalyst which is circulated in a system comprising a conversion zone in which hydrocarbon vapors are contacted at endothermic conversion conditions with said fluent solid catalyst and a regeneration zone in which the catalytic activity of the catalyst is regenerated by combustion of coke deposited on the catalyst during the conversion of the hydrocarbon vapors, the improvement which comprises introducing hydrocarbon material at least partially in the liquid phase into a contacting zone, contacting said hydrocarbon material in said contacting zone with a downwardly moving non-turbulent bed of relatively inert granular fluent solid separable from said catalyst, the temperature of the inert solid being higher than that of the hydrocarbon material, producing hot vapors of said hydrocarbon material by direct heat exchange between said hydrocarbon material and said solid, separately removing said hydrocarbon vapors and said solid from the contacting zone, converting said hydrocarbon vapors by passing them through the conversion zone in contact with a downwardly moving non-turbulent bed of said catalyst at conversion temperature, separately removing converted hydrocarbon vapors and coked catalyst from the conversion zone, contacting a downwardly moving non-turbulent bed comprising commingled relatively inert fluent solid from said contacting zone and coked catalyst from said conversion zone with an oxidizing gas in a regeneration zone so as to regenerate the catalyst and to heat said commingled relatively inert solid and catalyst by the combustion of coke deposited thereon, separating heated relatively inert fluent solid from regenerated fluent solid catalyst, returning heated relatively inert fluent solid to the contacting zone and returning regenerated fluent solid catalyst to the conversion zone.

2. The improvement of claim 1 characterized by introducing said hydrocarbon material to said downwardly moving non-turbulent bed of relatively inert granular fluent solid in the contacting zone at a point intermediate of the vertical extent of said bed and passing the hot hydrocarbon vapors produced by direct heat exchange between the hydrocarbon material and the relatively inert solid upwardly in countercurrent flow relationship with the downwardly moving bed of relatively inert fluent solid in the contacting zone.

3. The improvement of claim 2 further characterized by introducing to said contacting zone hydrocarbon material which is incompletely vaporized at the temperature of said relatively inert solid at the point of introduction, vaporizing only a portion of the hydrocarbon material by direct heat exchange with said relatively inert solid at the point of introduction, passing hydrocarbon vapors so produced upwardly through the part of said downwardly moving bed of relatively inert solid above said point of introduction, separating said hydrocarbon vapors from said relatively inert solid at a point substantially vertically above the point of introduction of said hydrocarbon material, and maintaining the liquid portion of said hydrocarbon material on the part of the downwardly moving bed of relatively inert solid below the point of introduction for sufficient time and at a sufficient temperature to viscosity break at least a part of said liquid portion to volatile products and non-volatile carbonaceous material.

4. The improvement of claim 1 characterized by maintaining conditions in said regeneration zone so that the lowest part of said downwardly moving bed comprising commingled relatively inert fluent solid and catalyst is at a temperature substantially above the temperature in the conversion zone, cooling the catalyst after separation from the relatively inert fluent solid to substantially the conversion temperature, and contacting said hydrocarbon material with sufficient relatively inert solid in said contacting zone to produce hydrocarbon vapors having a temperature substantially above the temperature in the conversion zone and a heat content which substantially compensates for the endothermic heat of conversion.

5. The improvement of claim 1 characterized in that the hydrocarbon conversion process is cracking.

6. The improvement of claim 1 characterized in that the relatively inert fluent solid is finer than the fluent solid catalyst and the relatively inert solid is separated from the catalyst according to particle size.

7. In hydrocarbon conversion processes employing fluent granular solid hydrocarbon conversion catalyst which is circulated in a system comprising a conversion zone in which hydrocarbon vapors are contacted at conversion conditions with said fluent solid conversion catalyst and a regeneration zone in which the catalytic activity of the catalyst is regenerated by combustion of coke deposited on the catalyst during the conversion of the hydrocarbon vapors, the improvement which comprises introducing into a contact zone hydrocarbon material at least partially in the liquid phase, said hydrocarbon material being associated with non-volatile inorganic compounds, contacting said hydrocarbon material with a downwardly moving non-turbulent bed of relatively inert granular fluent solid separable from said catalyst, the temperature of said solid being higher than that of said hydrocarbon material, producing hot hydrocarbon vapors by direct heat exchange between said hydrocarbon material and said solid, retaining said inorganic compounds as a deposit on said relatively inert fluent solid, converting said hydrocarbon vapors by passing them through the conversion zone in contact with a downwardly moving non-turbulent bed of said catalyst, separately removing converted hydrocarbon vapors and coked catalyst from said conversion zone, contacting a downwardly moving non-turbulent bed of commingled relatively inert fluent solid from said contacting zone and coked catalyst from said conversion zone with an oxidizing gas in a regeneration zone to regenerate the catalyst and to heat said commingled relatively inert solid and catalyst by combustion of coke deposited thereon, separating heated relatively inert fluent solid from regenerated fluent solid catalyst, returning at least a portion of the heated relatively inert fluent solid to the contacting zone, returning regenerated fluent solid conversion catalyst to the conversion zone, removing said inorganic compounds from a portion of the relatively inert fluent solid, and introducing the relatively inert solid so treated into the regeneration zone.

HENRY D. NOLL.

REFERENCES CITED

The following references are of record in the file of this patent:

UNITED STATES PATENTS

| Number | Name | Date |
|---|---|---|
| 2,376,564 | Upham et al. | May 22, 1945 |
| 2,378,531 | Becker | June 19, 1945 |
| 2,379,159 | Kanhofer | June 26, 1945 |
| 2,393,636 | Johnson | Jan. 29, 1946 |
| 2,414,736 | Gray | Jan. 21, 1947 |

OTHER REFERENCES

Gaudin, "Principles of Mineral Dressing," pub. by McGraw Hill (1939) New York, page 54 (1 page only).